(12) United States Patent
Tan et al.

(10) Patent No.: US 11,093,631 B2
(45) Date of Patent: Aug. 17, 2021

(54) DATA ACCESS AUTHORITY MANAGEMENT METHOD, APPARATUS, TERMINAL DEVICE AND STORAGE MEDIUM

(71) Applicant: Ping An Technology (Shenzhen) Co., Ltd., Guangdong (CN)

(72) Inventors: Zhijie Tan, Guangdong (CN); Yongjian Liang, Guangdong (CN); Chuan Zhang, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 440 days.

(21) Appl. No.: 16/098,129

(22) PCT Filed: Feb. 28, 2018

(86) PCT No.: PCT/CN2018/077473
§ 371 (c)(1),
(2) Date: Nov. 1, 2018

(87) PCT Pub. No.: WO2019/056705
PCT Pub. Date: Mar. 28, 2019

(65) Prior Publication Data
US 2020/0356688 A1 Nov. 12, 2020

(30) Foreign Application Priority Data
Sep. 19, 2017 (CN) .......................... 201710845614.3

(51) Int. Cl.
*G08B 23/00* (2006.01)
*G06F 12/16* (2006.01)
(Continued)

(52) U.S. Cl.
CPC ...... *G06F 21/6218* (2013.01); *G06F 16/2282* (2019.01); *G06F 16/24573* (2019.01);
(Continued)

(58) Field of Classification Search
CPC .......... G06F 16/24573; G06F 16/2282; G06F 16/288
(Continued)

(56) References Cited

U.S. PATENT DOCUMENTS 9,948,655 B1 * 4/2018 Gerweck ............. G06F 21/6218
10,521,442 B1 * 12/2019 Gatchell ................ G06Q 40/06
(Continued)

FOREIGN PATENT DOCUMENTS

| CN | 101178730 A | 5/2008 |
|---|---|---|
| CN | 104063636 A | 9/2014 |

OTHER PUBLICATIONS

Fabio Massacci; Tableau Methods for Formal Verification of Multi-Agent Distributed Systems; IEEE: 1998; p. 1-29.*

*Primary Examiner* — Monjur Rahim (57) ABSTRACT

This application discloses a data access authority management method, apparatus, terminal device and storage medium. The data access authority management method comprises obtaining report metadata in Tableau, the report metadata comprises report ID; creating folder data in Portal platform, the folder data comprises at least one folder, and the folder comprises folder ID; creating a correlation relationship between the report ID and the folder ID in Portal platform; obtaining user class authority configuration request entered by user, the user class authority configuration request comprises user class ID and target folder ID; performing user class authority configuration based on the user class authority configuration request in Portal platform, so as to enable the user class corresponding to the user class ID to have access authority to access report metadata which is corresponded to the report ID corresponding to the target folder ID.

12 Claims, 4 Drawing Sheets

(51) Int. Cl.
*G06F 12/14* (2006.01)
*G06F 11/00* (2006.01)
*G06F 21/62* (2013.01)
*G06F 16/2457* (2019.01)
*G06F 16/22* (2019.01)
*G06F 16/28* (2019.01)
*G06F 21/31* (2013.01)

(52) U.S. Cl.
CPC ............ *G06F 16/288* (2019.01); *G06F 21/31* (2013.01); *G06F 2221/2141* (2013.01)

(58) Field of Classification Search
USPC .......................................................... 726/25
See application file for complete search history.

(56) References Cited

U.S. PATENT DOCUMENTS

2003/0187821 A1\* 10/2003 Cotton .................. G06Q 10/10
2017/0371926 A1\* 12/2017 Shiran ............... G06F 16/24542
2018/0081953 A1\* 3/2018 Goedken ............ G06F 16/2474
2018/0082227 A1\* 3/2018 Goedken .............. G06F 16/235
2020/0374535 A1\* 11/2020 Makeev ............... H04N 19/176

\* cited by examiner

DATA ACCESS AUTHORITY MANAGEMENT METHOD, APPARATUS, TERMINAL DEVICE AND STORAGE MEDIUM

This application is based on a Chinese invention patent application with its application number 201710845614.3, submitted on Sep. 19, 2017, entitled as "data access authority management method, apparatus, device, and storage medium", with a purpose to claim its priority.

FIELD OF THE INVENTION

The present application relates to a technical field of a data access authority management technology, particularly, a data access authority management method, apparatus, terminal device and storage medium.

BACKGROUND OF THE INVENTION

Tableau software is an American interactive data visualization software company focused on business intelligence and Tableau is won by Tableau Software LLC which trademarked and patented. Tableau is a simple intelligent Business (BI) tool for desktop systems dedicated to helping people view and understand data. Tableau comprises Tableau Desktop and Tableau Server. Tableau Desktop is the client for Appling Tableau, while Tableau Server is the Server of Tableau. Tableau Desktop is a software application that analyzes any structured data that actually exists to generate beautiful charts, graphs, and dashboards and reports in minutes. Tableau Server is an enterprise intelligent software that provides browser-based analysis that anyone can learn and use. Tableau Server is a software application that makes it quick and easy to share the latest interactive data visualizations, dashboards, reports, and workbooks on Tableau Desktop. Tableau is a very popular BI tools, which can realize to visual display of storage report in advance, but in current Tableau Server permission management, any report can only be owned by one user which results in inflexibility of Tableau permission management. When companies use Tableau, due to inflexibility of Tableau Server permission management, It cannot configure different permissions for users of different organizations, departments or positions within an enterprise for the same report, so that each report needs to be saved and configured with different permissions, which affects the application of Tableau.

SUMMARY OF THE INVENTION

The application provides a data access authority management method, apparatus, terminal device and storage medium with the purpose to solve the problem that the current Tableau lacks a powerful permission management mechanism.

In a first aspect, the present application provides a data access authority management method, comprising:

obtaining report metadata in Tableau, the report metadata comprises report ID;

creating folder data in Portal platform, the folder data comprises at least one folder, and the folder comprises folder ID;

creating a correlation relationship between the report ID and the folder ID in Portal platform;

obtaining a user class authority configuration request entered by a user, the user class authority configuration request comprises user class ID and target folder ID;

performing a user class authority configuration in Portal platform based on the user class authority configuration request, so as to enable a user class corresponding to the user class ID to have access authority to access report metadata which is corresponded to folder ID corresponding to the target folder ID.

In a second aspect, the present application provides a data access authority management apparatus comprising:

a report metadata obtaining module configured to obtain report metadata in Tableau, the report metadata comprises report ID;

a folder data creation module configured to create folder data in Portal platform, the folder data comprises at least one folder, and the folder comprises folder ID;

a correlation relationship creation module configured to create a correlation relationship between the report ID and the folder ID in Portal platform;

a user class request obtaining module configured to obtain a user class authority configuration request entered by a user, the user class authority configuration request comprises user class ID and target folder ID;

a user class authority configuration module configured to perform a user class authority configuration in Portal platform based on the user class authority configuration request, so as to enable a user class corresponding to the user class ID to have access authority to access report metadata which is corresponded to folder ID corresponding to the target folder ID.

In a third aspect, the present application provides a terminal device, comprising a memory, a processor and computer readable instructions which is stored in the memory and run on the processor, wherein following steps are performed when the processor executes the computer readable instructions:

obtaining report metadata in Tableau, the report metadata comprises report ID;

creating folder data in Portal platform, the folder data comprises at least one folder, and the folder comprises folder ID;

creating a correlation relationship between the report ID and the folder ID in Portal platform;

obtaining a user class authority configuration request entered by a user, the user class authority configuration request comprises user class ID and target folder ID;

performing a user class authority configuration in Portal platform based on the user class authority configuration request, so as to enable a user class corresponding to the user class ID to have access authority to access report metadata which is corresponded to folder ID corresponding to the target folder ID.

In a fourth aspect, the present application provides a computer readable storage medium, the computer readable storage medium stores computer readable instructions, following steps are performed when the processor executes the computer readable instructions:

obtaining report metadata in Tableau, the report metadata comprises report ID;

creating folder data in Portal platform, the folder data comprises at least one folder, and the folder comprises folder ID;

creating a correlation relationship between the report ID and the folder ID in Portal platform;

obtaining a user class authority configuration request entered by a user, the user class authority configuration request comprises user class ID and target folder ID;

performing a user class authority configuration in Portal platform based on the user class authority configuration request, so as to enable a user class corresponding to the user class ID to have access authority to access report metadata which is corresponded to folder ID corresponding to the target folder ID.

This application provides a data access authority management method, apparatus, terminal device and storage medium by way of configuring the user class corresponding to the user class ID to have access authority to access report metadata which is corresponded to a folder corresponding to the target folder ID, thus to enable the user class corresponding the user class to have access authority to access the report metadata in a corresponding folder, and the report metadata is correlated with the report ID and stored in Tableau, so that a permission for each report metadata in Tableau Server to be related to a user class rather than a single user, so as to achieve a flexible management of an access authority to a report in Tableau Server, and to improve an application range of Tableau.

BRIEF DESCRIPTION OF THE DRAWINGS

In order to more clearly illustrate the technical solutions in the embodiments of the present invention, the drawings configured in the description of the embodiments will be briefly described below. Obviously, the drawings in the following description are merely some embodiments of the present invention. For those skilled in the art, other drawings may also be obtained based on these drawings without any creative work.

DETAILED DESCRIPTION OF THE EMBODIMENTS

The technical solutions in the present application are clearly and completely the in the following with reference to the drawings in the present application. It is obvious that the embodiments are a part of the embodiments of the present application, and not all of the embodiments. All other embodiments obtained by a person of ordinary skill based on the embodiments of the present application without taking creative work are the scope of the present application.

The First Embodiment

Figure 1:
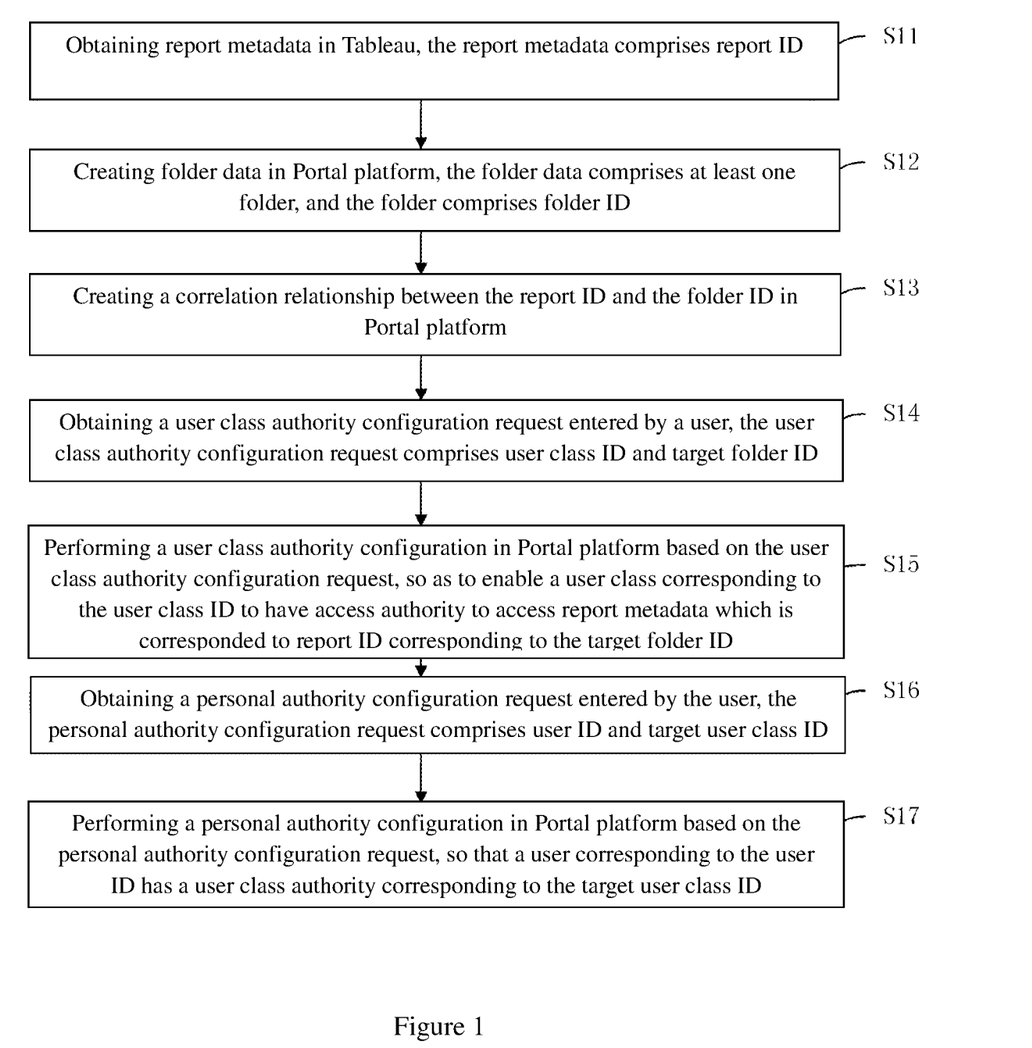
FIG. 1 is a flow chart of a data access authority management method in a first embodiment.

FIG. 1 shows the flow chart of the data access authority management method in this embodiment. This data access authority management method is configured to improve the problem of inflexible access management of Tableau Server so as to manage the report an access authority of companies flexibly. As shown in FIG. 1, the data access authority management method comprises the following steps:

S11: obtaining report metadata in Tableau, the report metadata comprises report ID.

Tableau is a software application configured to analyze any structured data that actually exists to generate beautiful charts, coordinate diagrams, dashboards, and reports in a few minutes. The report metadata is the original data required to be processed by Tableau, which exists as a report. The report ID is configured to uniquely identify report metadata, and each report metadata corresponds to one report ID.

In this embodiment, user can obtaining report metadata by way of creating new report metadata in Tableau Desktop which is displayed in client and upload report metadata to Tableau Server, so that Tableau metadata Server can obtain report medadata. Alternatively, the user can use an input method in Tableau Desktop displayed in client to input report metadata created, and then sent the report metadata to Tableau Server, so that Tableau Server can obtain the report metadata. Then visualization displaying is performed based on user selected charts, coordinate diagrams, dashboards and reports, so as to improve display effect of report metadata displaying.

In a specific embodiment, step S11 specifically comprises: storing the report metadata in Postgre SQL database, and forming a report relationship table, the report relationship table comprises at least one report metadata information, the report metadata information comprises the report ID and report name.

Postgre SQL is a free object-relational database server (a database management system), Postgre SQL supports most of the SQL standard and offers many other modern features, such as complex queries, foreign keys, triggers, views, transaction integrity check, Multiple Version Concurrent Control (MVCC), and other features. A report relationship table is a relational table for information management of report metadata stored in Postgre SQL database. A report relationship table comprises at least one report metadata information to manage report metadata stored in Postgre SQL database based on that report metadata information. The report metadata information comprises but is not limited to the table ID and the table name in this embodiment, and can also comprise a creator name, creator ID and upload time of the report metadata.

In this embodiment, the user can obtain the report metadata by using a new report metadata method on Tableau Desktop displayed by the client, and then upload the report metadata to Tableau Server, so that Tableau Server can obtain the report metadata. Alternatively, the user can input a created report metadata on Tableau Desktop displayed by the client and send the report metadata to Tableau Server so that Tableau Server can obtain the report metadata and then visualization displaying is performed based on user selected charts, coordinate diagrams, dashboards, and reports, so as to improve display effect of report metadata displaying.

S12: creating folder data in Portal platform, the folder data comprises at least one folder, and the folder comprises folder ID.

Portal platform refers to Portal platform which is an information management platform integrating various applications, data resources and internet resource sets. Portal platform to provide users with a unified user interface so that users can quickly set up information channels between enterprises and clients, between enterprises and enterprise internal staffs, and between enterprises and enterprises, so as to store all kinds of information related to enterprises. The folder ID is the only mark to identify the folder, and each folder corresponds to one folder ID which can be configured to obtain a corresponding folder. Understandably, a folder comprises not only the folder ID, but also folder name for a well folder management based on the folder ID and the folder name.

In this embodiment, folder data created in Portal platform comprises multiple nested folder groups, each group comprises at least one folder. It is understandable that in the multi-layer nested folder groups, each upper-layer folder group is nested with at least one lower-level folder group. For example, when creating folder data of a group company in Portal platform, the first layer folder group can be divided according to subsidiaries of the group company. For instance, Ping An group company has two subsidiaries of bank and insurance, folder names of the first layer folder group are "bank" and "insurance", and corresponding folder IDs are W01 and W02, respectively. Based on different business institutions, the first layer folder group of "insurance" can also be divided into second layer folder groups corresponding to "property insurance" and "life insurance" with corresponding folder IDs W0201 and W0202, respectively. The third layer folder group of "property insurance" can also be divided into fourth layer folder groups corresponding to "Guang Dong Province" and "Shanghai Province" according to regions, and corresponding folder IDs are W020101 and W020102, respectively. Based on this analogy, until a folder corresponding to the minimum team in the enterprise is allocated to store the report metadata corresponding to the minimum team.

In a specific embodiment, step 12 specifically comprises: creating folder data in Portal platform, storing the folder data in Oracle database, and forming a folder relationship table, the folder relationship table comprises at least one folder information, the folder information comprises the folder ID and folder name.

The Oracle Database (also known as Oracle RDBMS, or Oracle for short) is a relational Database management system, the relational Database management system has good portability, strong function, and is easy to use, suitable for all kinds of large, medium, small, micro-computer environment. The Oracle database is an efficient, reliable, high data secured and stable database. The folder relationship table is a relational table configured to manage folder data stored in Oracle database. The folder relationship table comprises at least one folder information. The folder information comprises, but is not limited to, the folder ID and folder name in this embodiment, the folder information can further comprise a creator name, creator ID, and upload time of the folder when the folder is created.

S13: creating a correlation relationship between the report ID and the folder ID in Portal platform.

In this embodiment, creating a correlation relationship between report ID and folder ID in Portal platform enables the folder corresponding to each folder ID to store report metadata corresponding to report ID, and therefore to find the report metadata corresponding to report ID based on the correlation relationship and definite folder ID, or search for a corresponding folder corresponding to the folder ID based on the correlation relationship and definite folder ID.

In a specific embodiment, step S13 specifically comprises: creating a correlation relationship information table in Portal platform, the correlation relationship information table comprises at least one correlation relationship information, the correlation relationship information comprises the report ID and the folder ID, so as to create an correlation relationship between report ID and folder ID in Portal platform.

The correlation relationship information table is an information table configured to store the correlation relationship between the report ID and the folder ID. The correlation relationship information comprises at least one correlation relationship information, each correlation relationship information comprises, but not limited to, the report ID and the folder ID, so as to create a correlation relationship between report metadata corresponding to report ID created in Tableau and a folder corresponding the folder ID built in Portal platform. The correlation information can also comprise a creator name, creator ID, and creation time of the correlation relationship information table when it is created. Understandably, through the correlation relationship information table created in Portal platform, corresponding to report ID can be found by each correlation relationship information and definite folder ID to obtain report metadata corresponding to report ID; or, obtaining a folder corresponding the folder ID based on each correlation relationship information and definite report ID.

S14: obtaining a user class authority configuration request entered by a user, the user class authority configuration request comprises user class ID and target folder ID.

The user class authority configuration request is configured to request access authority for the folder corresponding to the target folder ID to allow the user class corresponding to user class ID to access. The user class ID is the only mark to identify user class. The user class is a class that can be set according to a user role during a permission configuration process, the user class can be represented by User Class. The target folder ID is the folder ID determined in this user class authority configuration request. In this embodiment, an enterprise management person can enter the user class authorities configuration request in Portal platform, so that access authority to access the folder corresponding to the target folder ID can be distributed to the user class ID corresponding user ID according to the user class authority configuration request, thus to enable the user class corresponding to the user class ID to have access authority to access the report metadata which is corresponded to folder ID corresponding to the target folder ID.

S15: performing a user class authority configuration in Portal platform based on the user class authority configuration request, so as to enable a user class corresponding to the user class ID to have access authority to access report metadata which is corresponded to folder ID corresponding to the target folder ID.

In particular, the user class information table can be created in portal platform, the user class information table comprises at least one user class information, each user class information comprises not only the user ID and the target folder ID, may also comprise permission configuration time or other information. Understandably, each time Portal platform receives a user class authority configuration request, namely to create a user class information in the user class information table with the purpose to limit the user class corresponding to user class ID to access the folder (namely the target folder) corresponding the target folder ID, which means that, to limit the access report metadata corresponding to report ID in the target folder. In this embodiment, when a user class authority configuration based on user class authority configuration request is configured, define the user class of the folder (namely the target folder) corresponding to the target folder ID as a target folder holder, for instance, the user class can generally be the as XX XX team of XX XX organization of XX XX department of XX XX company, and so on.

Understandably, since the folder data created in Portal platform comprises multiple nested folder groups, each group comprises at least one folder. When the user class authority is configured, the user class can be configured with multi-level nested configurations to match multi-layer nested folder groups, so as to improve flexibility and efficiency of a permission management. For example, when the user class is configured at multiple levels, it can be configured into a first-level user class, a second-level user class, a third-level user class to an N-level user class, etc., for following permission management controlling. Understandably, there is at least one second-level user class in the first-level user class, and each second-level user class comprises at least one third-level user class, so that each upper-level user class can comprise at least one lower-level user class. When the user class authority is configured, a user with the upper-level user class can view the report metadata of the lower-level user class which is corresponded to the folder (that is, the target folder) corresponding to the target folder ID, and a user with the lower-level user class cannot view the report metadata of the upper-level user class which is corresponded to the folder (that is, the target folder) corresponding to the target folder ID.

In the data access authority management method provided by this embodiment, obtaining report metadata corresponding to report ID in Tableau to store the report metadata; then creating folder data corresponding to folder ID in portal platform and creating a correlation relationship between the report ID and the folder ID, so as to make the folder corresponding the folder ID capable of storing the report metadata corresponding to the report ID; Then performing a user class authority configuration in Portal platform based on the user class authority configuration request, so as to enable a user class corresponding to the user class ID to have access authority to access report metadata which is corresponded to a folder (namely target folder) corresponding to the target folder ID, namely to access the report metadata corresponding to the report ID stored in target folder.

Understandably, in the data access management method, by means of configuring the user class corresponding to the user class ID in Portal platform to have access authority to access the folder (namely, the target folder) corresponding to the target folder ID, thus to enable the user class corresponding the user class ID to have access authority to access the report metadata correlated to the report ID in a the target folder and created in Tableau, so that a permission for each report metadata in Tableau Server to be related to a user class rather than a single user, so as to achieve a flexible management of an access authority to a report in Tableau Server, and to improve an application range of Tableau.

In a specific implementation, the data access authority management method also comprises the following steps:

S16: obtaining a personal authority configuration request entered by the user, the personal authority configuration request comprises user ID and target user class ID.

The user ID is used as the only mark to identify the user's identity, and the user ID can be configured to uniquely identify the employee's work number of the company. The target user class ID is configured to uniquely identify the user class to which the user corresponding to the user ID corresponds. In this embodiment, during configuring the user class authority based on user class authority configuration request, define a user class of the folder (that is, the target folder) ID corresponding to the target folder as a target folder holder, such as a user class can generally be the as XX team of XX organization of XX department of XX company, and so on. When managing employees of the company, the employees of the user can be given a permission to access report metadata in their accessible folder according to the user class they belong to. In particular, the user (i.e., managers) can log in to Portal platform access configuration interface, the user (i.e., managers) can enter the user ID, and select corresponding target user class in a created user ID list, and then click "submit" button to enter the personal authority configuration request, so that Portal platform obtains the corresponding personal authority configuration request to complete the permission configuration for any company employee (i.e., the user corresponding to the user ID) based on the personal authority configuration request.

S17: performing a personal authority configuration in Portal platform based on the personal authority configuration request, so that a user corresponding to the user ID has a user class authority corresponding to the target user class ID.

In particular, a personal information table can be created in Portal platform, the information table comprises at least one personal information, each personal information comprises, but not limited to, personal information such as user ID and a user name, and may also comprises user ID correlated target user class ID. Each time Portal platform receives a personal authority configuration request, it can newly add one personal information in the personal information table, new user ID and target class user ID is added to the corresponding personal information table, with the purpose to complete the personal authority configuration, so that the user corresponding to the user ID has a permission of the user class corresponding to the target class ID.

In this embodiment, since Portal platform has pre-configured folder data, such folder data comprises at least one folder, and forms a correlation relationship between report ID corresponding to each report metadata created in Tableau and folder ID; Through the user class authority configuration, making each user class corresponding to the user class ID can be corresponded to a folder (that is, the target folder) corresponding the target folder ID, so as to enable the user class corresponding to the user ID to be a holder of the folder (that is, the target folder) corresponding to the target folder ID; Finally, through the personal authority configuration, the user class corresponding to the target user class ID is configured for the user corresponding to the user ID, so that the user corresponding to the user ID has the permission of the user class corresponding to the target user class ID, and the report metadata corresponding to the report ID in the target folder can be accessed.

Figure 2:
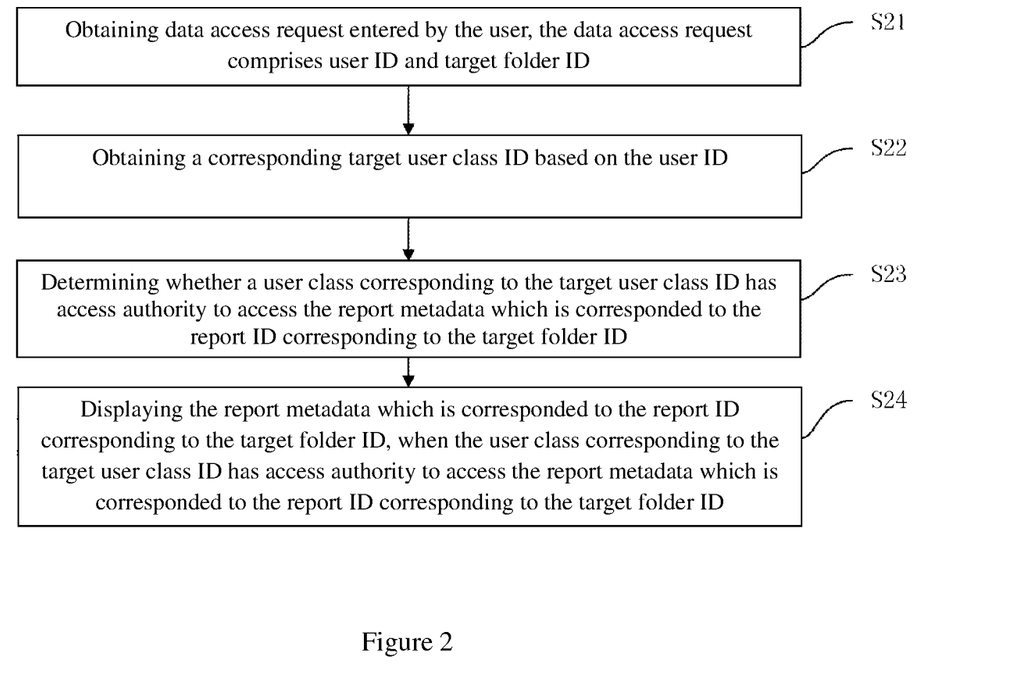
FIG. 2 is another flow chart of the data access authority management method in the first embodiment.

In a specific implementation mode, as shown in FIG. 2, the data access authority management method also comprises:

S21: obtaining data access request entered by the user, the data access request comprises the user ID and the target folder ID.

data access request is a request to access the corresponding report metadata in the target folder. the target folder ID is the folder ID corresponding to the target folder that the user wants to access. In this embodiment, a user corresponding to any user ID can log in to Portal platform so that all requests entered by that users on Portal platform carry user IDs. After a user logs in to Portal platform, he can enter the target folder ID directly, or he can also enter the target folder ID by dragging and dropping, and then click the "Submit" button to enter the data access request.

Since Portal platform has pre-configured folder data, such folder data comprises at least one folder, and forms a correlation relationship between report ID corresponding to each report metadata created in Tableau and folder ID; Through the user class authority configuration, making each user class corresponding to the user class ID can be corresponded to a folder (that is, the target folder) corresponding the target folder ID, so as to enable the user class corresponding to the user ID to be a holder of the folder (that is, the target folder) corresponding to the target folder ID;

Finally, through the personal authority configuration, the user class corresponding to the target user class ID is configured for the user corresponding to the user ID, so that the user corresponding to the user ID has the permission of the user class corresponding to the target user class ID, and the report metadata corresponding to the report ID in the target folder can be accessed.

S22: obtaining a corresponding target user class ID based on the user ID.

The target user class ID is user class ID corresponding to the user class to which the user corresponding to the user ID belongs. It can be understood that each time Portal platform receives a data access request, the user ID in the data access request is obtained, and a pre-created personal information table is queried based on the user ID, and then the target user class ID correlated to the user ID is obtained. It can be understood that, due to cross-setting of employee positions in an enterprise, a company employee can correspond to a target user class ID, and may also correspond to multiple target user class IDs.

S23: determining whether a user class corresponding to the target user class ID has access authority to access the report metadata which is corresponded to the report ID corresponding to the target folder ID.

Specifically, Portal platform obtains the target folder ID in the data access request when receiving the data access request, and obtains a corresponding target user class ID through step S22, and then queries the pre-created personal information table in Portal platform to determine whether the target user class ID and the target folder ID are in the same user class information. If the target user class ID and the target folder ID are in the same user class information, it is determined that the user class corresponding to the target user class ID has the access authority to access the folder (i.e., the target folder) corresponding to the target folder ID, that is, has the access authority to access the report metadata corresponding to the report ID correlated with the target folder ID. If the target user class ID and the target folder ID are not in the same user class information, it is determined that the user class authority corresponding to the target user class ID does not have the access authority to access the folder (i.e., the target folder) corresponding to the target folder ID.

S24: displaying the report metadata which is corresponded to the report ID corresponding to the target folder ID, when the user class corresponding to the target user class ID has access authority to access the report metadata which is corresponded to the folder ID corresponding to the target folder ID.

It can be understood that, if Portal platform determines that the user class corresponding to the target user class ID has the permission to access the report metadata which is corresponded to the report ID corresponding to the target folder ID, Portal platform may display the report metadata which is corresponded to the report ID corresponding to the target folder ID. Specifically, report metadata displayed on Portal platform may be the report metadata created by using Tableau to enable several users to access the same report metadata on Tableau through Portal platform.

It can be understood that, since the data access request inputted by the user comprises the user ID and the target folder ID, corresponding target user class ID may be determined based on the user ID, and then it is determined whether the user class corresponding to the target user class ID has the access authority to access the folder (i.e., the target folder) corresponding to the target folder ID; and when the user class corresponding to the target user class ID has the permission to access the target folder, the report metadata which is corresponded to the report ID corresponding to the target folder ID may be displayed on Portal platform. In the data access authority management method, a permission for each report metadata in Tableau Server to be related to a user class rather than a single user, so as to realize a flexible management of an access authority to a report in Tableau Server, and to improve an application range of Tableau.

It should be understood that the size of the serial number of each step in the above embodiments does not mean the order of execution, and the order of execution of each process should be determined by its function and internal logic, and should not constitute any limitation on the implementation process of the present application.

The Second Embodiment

Figure 3:
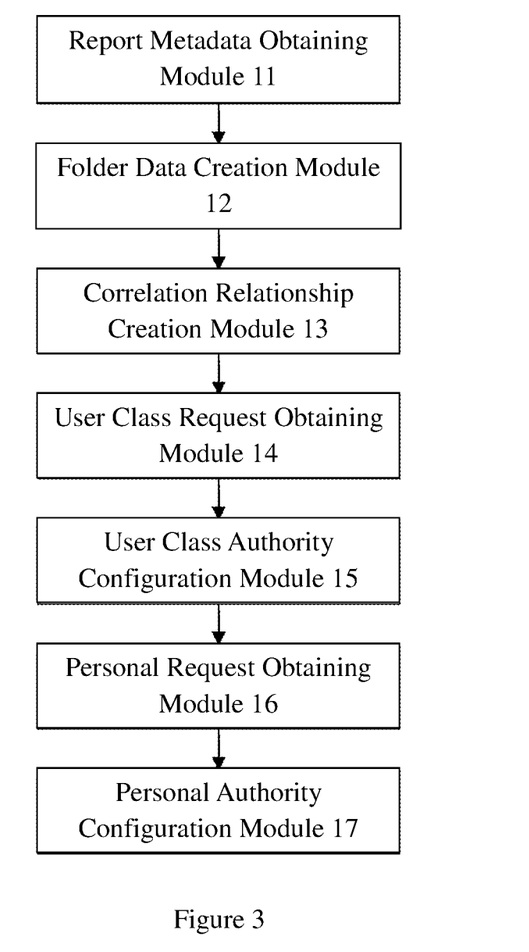
FIG. 3 is a schematic block diagram of a data access authority management apparatus in a second embodiment.

FIG. 3 is a block diagram showing the principle of the data access authority management apparatus corresponding to the data access authority management method in the first embodiment. As shown in FIG. 3, the data access authority management apparatus comprises a report metadata obtaining module 11, a folder data creation module 12, a correlation relationship creation module 13, a user class request obtaining module 14, a user class authority configuration module 15, and a personal request obtaining module 16 and a personal authority configuration module 17. Therein implementation functions of the report metadata obtaining module 11, the folder data creation module 12, the correlation relationship creation module 13, the user class request obtaining module 14, the user class authority configuration module 15, the personal request obtaining module 16, and the personal authority configuration module 17 are in one to one correspondence with the steps S11-S17 corresponding to the data access authority management method. To avoid redundancy, they will not be described in detail in the present embodiment.

The report metadata obtaining module 11 is configured to obtain report metadata in Tableau, the report metadata comprises report ID.

The folder data creation module 12 is configured to create folder data in Portal platform, the folder data comprises at least one folder, and the folder comprises folder ID.

The correlation relationship creation module 13 is configured to create a correlation relationship between the report ID and the folder ID in Portal platform.

The user class request obtaining module 14 is configured to obtain a user class authority configuration request entered by a user, the user class authority configuration request comprises user class ID and target folder ID.

The user class authority configuration module 15 is configured to perform a user class authority configuration in Portal platform based on the user class authority configuration request, so as to enable a user class corresponding to the user class ID to have access authority to access report metadata which is corresponded to folder ID corresponding to the target folder ID.

Further, the data an access authority management device further comprises the personal request obtaining module 16 and the personal authority configuration module 17.

The personal request obtaining module 16 is configured to obtain a personal authority configuration request entered by the user, the personal authority configuration request comprises user ID and target user class ID.

The personal authority configuration module 17 is configured to perform a personal authority configuration in Portal platform based on the personal authority configuration request, so that a user corresponding to the user ID has a user class authority corresponding to the target user class ID.

Further, the report metadata obtaining module 11 is further configured to store the report metadata in the Postgre SQL database, and form a report relationship table, the report relationship table comprises at least one report metadata information, the report metadata information comprises the report ID and report name.

The folder data creation module 12 is further configured to store the folder data in Oracle database, and form a folder relationship table, the folder relationship table comprises at least one folder information, the folder information comprises the folder ID and folder name.

The correlation relationship creation module 13 is further configured to create a correlation relationship information table in Portal platform, the correlation relationship information table comprises at least one correlation relationship information, the correlation relationship information comprises the report ID and the folder ID.

Further, the folder data comprises multilayer nested folder groups, each folder group comprises at least one folder.

Figure 4:
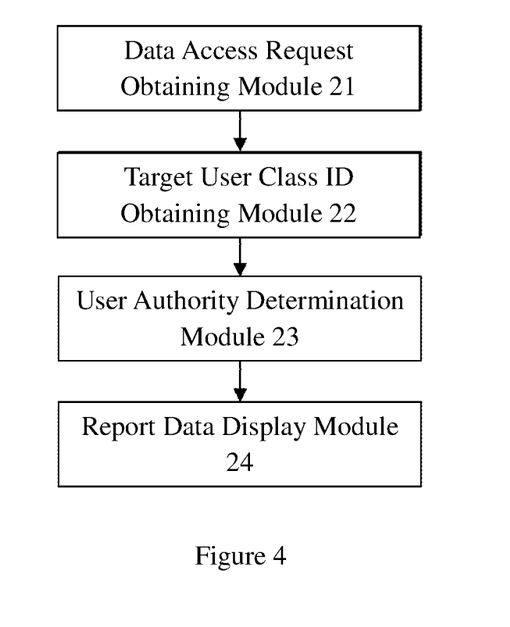
FIG. 4 is another schematic block diagram of the data access authority management apparatus in the second embodiment.

Further, as shown in FIG. 4, the data access authority management apparatus further comprises data access request obtaining module 21, target user class ID obtaining module 22, a user authority determination module 23, and a report data display module 24. Implementation functions of the data access request obtaining module 21, the target user class ID obtaining module 22, the user authority determination module 23, and the report data display module 24 are in one to one correspondence with the steps S21-S24 corresponding to the data access authority management method in the second embodiment. To avoid redundancy, they will not be described in detail in the present embodiment.

The data access request obtaining module 21 is configured to obtain data access request entered by the user, the data access request comprises the user ID and the target folder ID.

The target user class ID obtaining module 22 is configured to obtain a corresponding target user class ID based on the user ID.

The user authority determination module 23 is configured to determine whether user class corresponding to the target user class ID has access authority to access the report metadata which is corresponded to the report ID corresponding to the target folder ID.

The report data display module 24 is configured to display the report metadata which is corresponded to the report ID corresponding to the target folder ID, when the user class corresponding to the target user class ID has access authority to access the report metadata which is corresponded to the folder ID corresponding to the target folder ID.

The Third Embodiment

The embodiment provides a computer readable storage medium. The computer readable storage medium stores computer readable instructions. When the computer readable instructions are executed by the processor, the data access authority management method in the first embodiment is implemented. To avoid redundancy, they will not be described in detail. Alternatively, when the computer readable instructions are executed by the processor, functions of the modules/units in the data access authority management device in the second embodiment are implemented. To avoid repetition, details are not described herein again.

The computer readable storage medium may comprise any entity or device capable of carrying computer readable instruction code, a recording medium, a USB flash drive, a removable hard disk, a magnetic disk, an optical disk, a computer memory, a read-only memory, a random access memory, electrical carrier signals, telecommunications signals, and software distribution media, and so on.

The Fourth Embodiment

Figure 5:
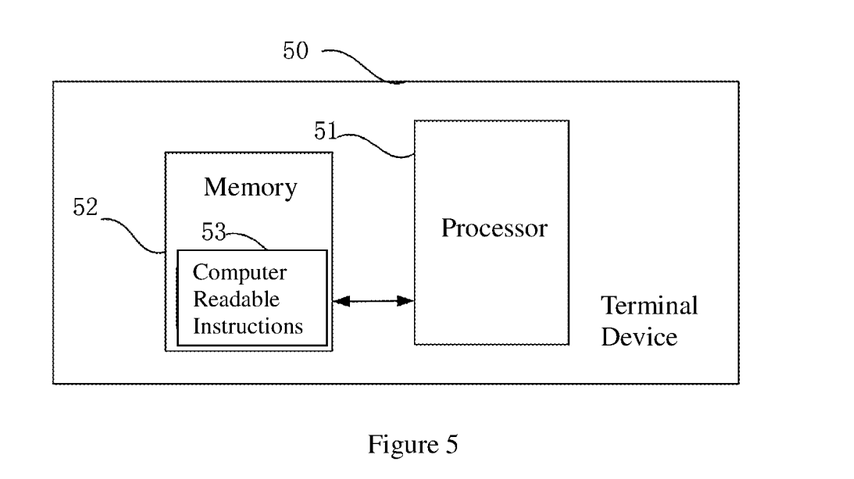
FIG. 5 is a schematic diagram of a terminal device in a fourth embodiment.

FIG. 5 is a schematic diagram of a terminal device 50 according to one embodiment of the present application. As shown in FIG. 5, the terminal device 50 of this embodiment comprises a processor 51, a memory 52, and computer readable instructions 53 stored in the memory 52 and operable on the processor 51. The processor 51 executes the computer readable instructions 53 to implement the various steps of the data access authority management method provided by the first embodiment described above, such as steps S11-S17 shown in FIG. 1, or steps S21-S24 shown in FIG. 2. Alternatively, when the processor 51 executes the computer readable instructions 53, functions of the modules/units in the data access authority management apparatus provided in the above second embodiment are realized. Functions of the report metadata obtaining module 11, the folder data creation module 12, the correlation relationship creation module 13, the user class request obtaining module 14, the user class authority configuration module 15, the personal request obtaining module 16, and the personal authority configuration module shown in FIG. 3; or functions of the data access request obtaining module 21, the target user class ID obtaining module 22, the user authority determination module 23, and the report data display module 24 in FIG. 4.

Illustratively, the computer readable instructions 53 may be partitioned into one or more modules/units, one or more modules/units are stored in memory 52 and executed by processor 51 to complete the application. The one or more modules/units may be an instruction segment of a series of the computer readable instructions 53 capable of performing a particular function, the instruction segment is configured to describe the execution of the computer readable instructions 53 in the terminal device 50.

For instance, the computer readable instruction 53 may be divided into the report metadata obtaining module 11, the folder data creation module 12, the correlation relationship creation module 13, the user class request obtaining module 14, the user class authority configuration module 15, the personal request obtaining module 16 and the personal authority configuration module 17 illustrated in FIG. 3, each module has the following specific functions:

The report metadata obtaining module 11 is configured to obtain report metadata in Tableau, the report metadata comprises report ID.

The folder data creation module 12 is configured to create folder data in Portal platform, the folder data comprises at least one folder, and the folder comprises folder ID.

The correlation relationship creation module 13 is configured to create a correlation relationship between the report ID and the folder ID in Portal platform.

The user class request obtaining module 14 is configured to obtain a user class authority configuration request entered by a user, the user class authority configuration request comprises user class ID and target folder ID.

The user class authority configuration module 15 is configured to perform a user class authority configuration in Portal platform based on the user class authority configuration request, so as to enable a user class corresponding to the user class ID to have access authority to access report metadata which is corresponded to folder ID corresponding to the target folder ID.

The personal request obtaining module 16 is configured to obtain a personal authority configuration request entered by the user, the personal authority configuration request comprises user ID and target user class ID.

The personal authority configuration module 17 is configured to perform a personal authority configuration in Portal platform based on the personal authority configuration request, so that a user corresponding to the user ID has a user class authority corresponding to the target user class ID.

Further, the report metadata obtaining module 11 is further configured to store the report metadata in the Postgre SQL database, and form a report relationship table, the report relationship table comprises at least one report metadata information, the report metadata information comprises the report ID and report name.

The folder data creation module 12 is further configured to store the folder data in Oracle database, and form a folder relationship table, the folder relationship table comprises at least one folder information, the folder information comprises the folder ID and folder name.

The correlation relationship creation module 13 is further configured to create a correlation relationship information table in Portal platform, the correlation relationship information table comprises at least one correlation relationship information, the correlation relationship information comprises the report ID and the folder ID.

Further, the folder data comprises multilayer nested folder groups, each folder group comprises at least one folder.

Alternatively, the computer readable instructions 53 may be divided into data access request obtaining module 21, target user class ID obtaining module 22, a user authority determination module 23 and a report data display module 24 shown in FIG. 4, and the specific functions of each module are as follows:

The data access request obtaining module 21 is configured to obtain data access request entered by the user, the data access request comprises the user ID and the target folder ID.

The target user class ID obtaining module 22 is configured to obtain a corresponding target user class ID based on the user ID.

The user authority judging module 23 is configured to determine whether user class corresponding to the target user class ID has access authority to access the report metadata which is corresponded to the report ID corresponding to the target folder ID.

The report data display module 24 is configured to display the report metadata which is corresponded to the report ID corresponding to the target folder ID, when the user class corresponding to the target user class ID has access authority to access the report metadata which is corresponded to the folder ID corresponding to the target folder ID.

The embodiments described above are only for explaining the technical solutions of the present invention, and are not limited thereto; although the present invention has been described in detail with reference to the above embodiments, those skilled in the art should understand: they can still modify the technical solutions described in the above embodiments, or replace some of the technical features; the modifications and replacements of the present invention do not make corresponding technical solutions separate from the spirit and scope of the technical solutions of the embodiments of the present invention, and should be comprised in the scope of the present invention.

What is claimed is:

1. A data access authority management method, comprising:
    obtaining report metadata in a business intelligence tool, wherein the report metadata comprises report ID;
    creating folder data in Portal platform, wherein the folder data comprises at least one folder, and the folder comprises folder ID;
    creating a correlation relationship between the report ID and the folder ID in Portal platform;
    obtaining user class authority configuration request entered by user, wherein the user class authority configuration request comprises user class ID and target folder ID;
    obtaining a personal authority configuration request entered by user, wherein the personal authority configuration request comprises user ID and target user class ID;
    performing, a personal authority configuration in Portal platform based on the personal authority configuration request, to enable a user corresponding to the user ID has a user class authority corresponding to the target user class ID and a user class authority configuration in Portal platform based on the user class authority configuration request, to enable a user class corresponding to the user class ID to have access authority to access report metadata which is corresponded to the folder ID corresponding to the target folder ID.

2. The data access authority management method according to claim 1, wherein the data access authority management method further comprises:
    obtaining data access request entered by user, wherein the data access request comprises user ID and target folder ID;
    obtaining a corresponding target user class ID based on the user ID;
    determining whether a user class corresponding to the target user class ID has access authority to access the report metadata which is corresponded to the report ID corresponding to the target folder ID;
    displaying the report metadata which is corresponded to the report ID corresponding to the target folder ID, if the user class corresponding to the target user class ID has the access authority to access the report metadata which is corresponded to the report ID corresponding to the target folder ID.

3. The data access authority management method according to claim 1, wherein the step of the obtaining report metadata in the business intelligence tool further comprises:
    storing the report metadata in Postgre SQL database, and forming a report relationship table, wherein the report relationship table comprises at least one report metadata information, the report metadata information comprises the report ID and report name;
    the step of creating folder data in Portal platform further comprises: storing the folder data in Oracle database, and forming a folder relationship table, the folder relationship table comprises at least one folder information, the folder information comprises folder ID and folder name;
    the step of creating the correlation relationship between the report ID and the folder ID in Portal platform comprises: creating a correlation relationship information table in Portal platform, the correlation relationship information table comprises at least one correlation relationship information, the correlation relationship information comprises the report ID and the folder ID.

4. The data access authority management method according to claim 1, wherein the folder data comprises multilayer nested folder groups, and each group comprises at least one folder.

5. A terminal device, comprising a memory, a processor and computer readable instructions which is stored in the memory and run on the processor, wherein the following steps are performed when the processor executes the computer readable instructions:

obtaining report metadata in a business intelligence tool, the report metadata comprises report ID;

creating folder data in Portal platform, the folder data comprises at least one folder, and the folder comprises folder ID;

creating a correlation relationship between the report ID and the folder ID in Portal platform;

obtaining a user class authority configuration request entered by a user, the user class authority configuration request comprises user class ID and target folder ID;

obtaining personal authority configuration request entered by the user, the personal authority configuration request comprises user ID and target user class ID;

performing, a personal authority configuration in Portal platform based on the personal authority configuration request, to enable a user corresponding to the user ID has a user class authority corresponding to the target user class ID and a user class authority configuration in Portal platform based on the user class authority configuration request, to enable a user class corresponding to the user class ID to have access authority to access report metadata which is corresponded to the folder ID corresponding to the target folder ID.

6. The terminal device according to claim 5, wherein following steps are further performed when the processor executes the computer readable instructions:

obtaining data access request entered by the user, the data access request comprises the user ID and the target folder ID;

obtaining a corresponding target user class ID based on the user ID;

determining whether a user class corresponding to the target user class ID has access authority to access the report metadata which is corresponded to the report ID corresponding to the target folder ID;

displaying the report metadata which is corresponded to the report ID corresponding to the target folder ID, when the user class corresponding to the target user class ID has access authority to access the report metadata which is corresponded to the report ID corresponding to the target folder ID.

7. The terminal device according to claim 5, wherein the obtaining report metadata in the business intelligence tool further comprises: storing the report metadata in Postgre SQL database, and forming a report relationship table, the report relationship table comprises at least one report metadata information, the report metadata information comprises the report ID and the report name;

the creating folder data in Portal platform further comprises: storing the folder data in Oracle database, and forming a folder relationship table, the folder relationship table comprises at least one folder information, the folder information comprises the folder ID and folder name;

the creating the correlation relationship between the report ID and the folder ID in Portal platform comprises: creating a correlation relationship information table in Portal platform, the correlation relationship information table comprises at least one correlation relationship information, the correlation relationship information comprises the report ID and the folder ID.

8. The terminal device according to claim 5, wherein the folder data comprises multilayer nested folder groups, each folder group comprises at least one folder.

9. A computer readable storage medium, the computer readable storage medium stores computer readable instructions, wherein the following steps are performed when the processor executes the computer readable instructions:

obtaining report metadata in a business intelligence tool, the report metadata comprises report ID;

creating folder data in Portal platform, the folder data comprises at least one folder, and the folder comprises folder ID;

creating a correlation relationship between the report ID and the folder ID in Portal platform;

obtaining a user class authority configuration request entered by a user, the user class authority configuration request comprises user class ID and target folder ID;

obtaining a personal authority configuration request entered by the user, the personal authority configuration request comprises user ID and target user class ID;

performing, a personal authority configuration in Portal platform based on the personal authority configuration request, to enable a user corresponding to the user ID has a user class authority corresponding to the target user class ID and a user class authority configuration in Portal platform based on the user class authority configuration request, to enable a user class corresponding to the user class ID to have access authority to access report metadata which is corresponded to the folder ID corresponding to the target folder ID.

10. The computer readable storage medium according to claim 9, wherein the following steps are further performed when the computer readable instruction is executed by the processor:

obtaining data access request entered by the user, the data access request comprises user ID and target folder ID;

obtaining a corresponding target user class ID based on the user ID;

determining whether a user class corresponding to the target user class ID has access authority to access the report metadata which is corresponded to the report ID corresponding to the target folder ID;

displaying the report metadata which is corresponded to the report ID corresponding to the target folder ID, if the user class corresponding to the target user class ID has access authority to access the report metadata which is corresponded to the report ID corresponding to the target folder ID.

11. The computer readable storage medium according to claim 9, wherein the obtaining report metadata in the business intelligence tool further comprises: storing the report metadata in Postgre SQL database, and forming a report relationship table, the report relationship table comprises at least one report metadata information, the report metadata information comprises the report ID and report name;

the creating folder data in Portal platform further comprises: storing the folder data in Oracle database, and forming a folder relationship table, the folder relationship table comprises at least one folder information, the folder information comprises the folder ID and folder name;

the creating the correlation relationship between the report ID and the folder ID in Portal platform comprises: creating a correlation relationship information table in Portal platform, the correlation relationship information table comprises at least one correlation relationship information, the correlation relationship information comprises the report ID and the folder ID.

12. The computer readable storage medium according to claim 9, wherein the folder data comprises multilayer nested folder groups, each folder group comprises at least one folder.

* * * * *